Aug. 4, 1959    C. A. MILES ET AL    2,898,021
APPARATUS FOR HANDLING HOSIERY
Filed June 6, 1956    6 Sheets-Sheet 1
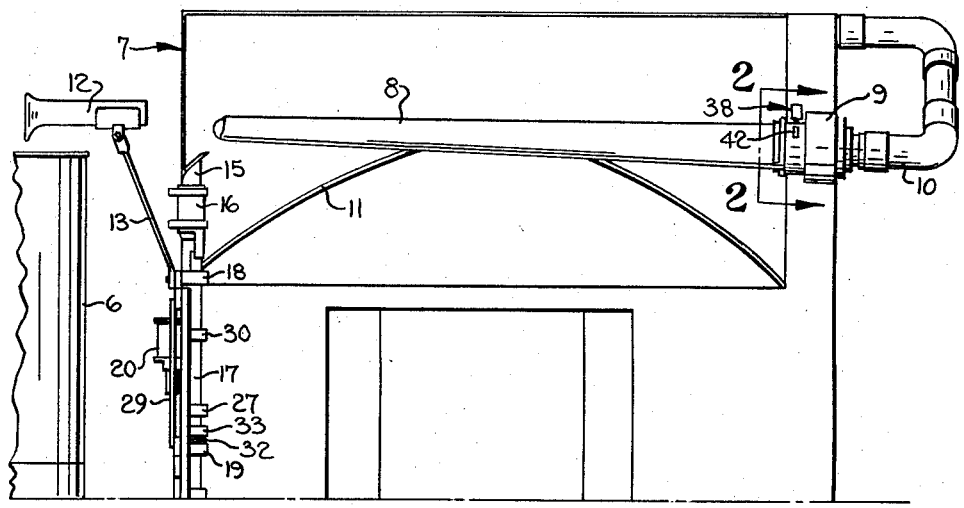
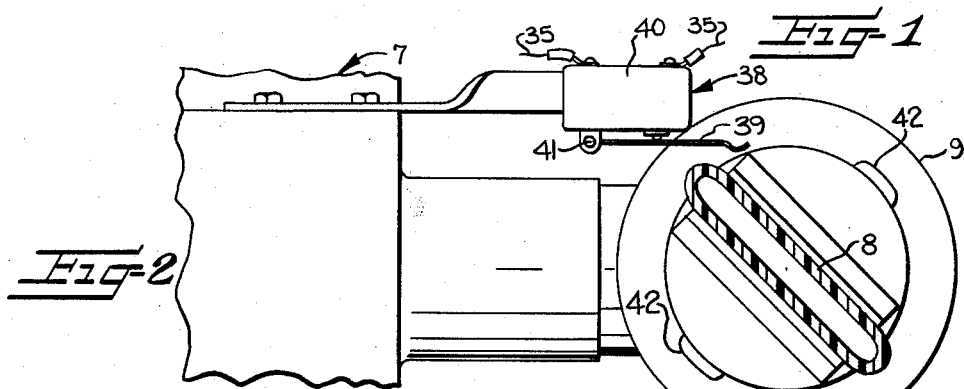
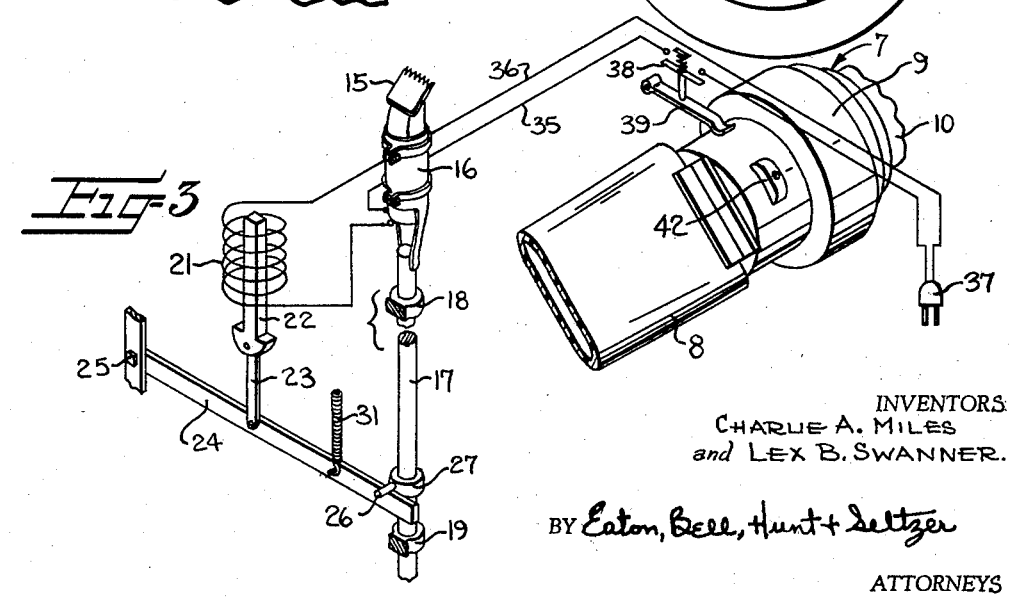
INVENTORS
CHARLIE A. MILES
and LEX B. SWANNER.
BY Eaton, Bell, Hunt + Seltzer
ATTORNEYS

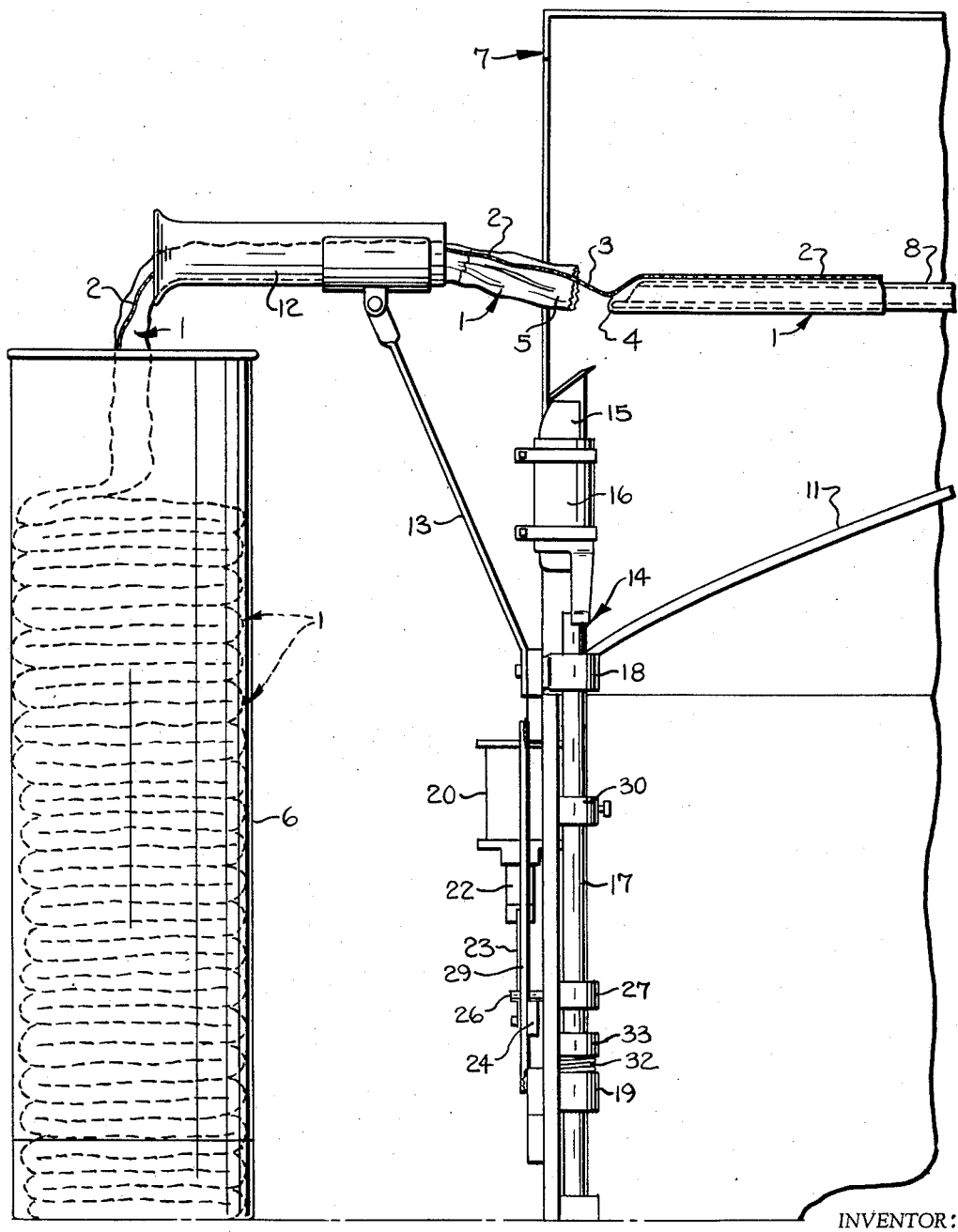

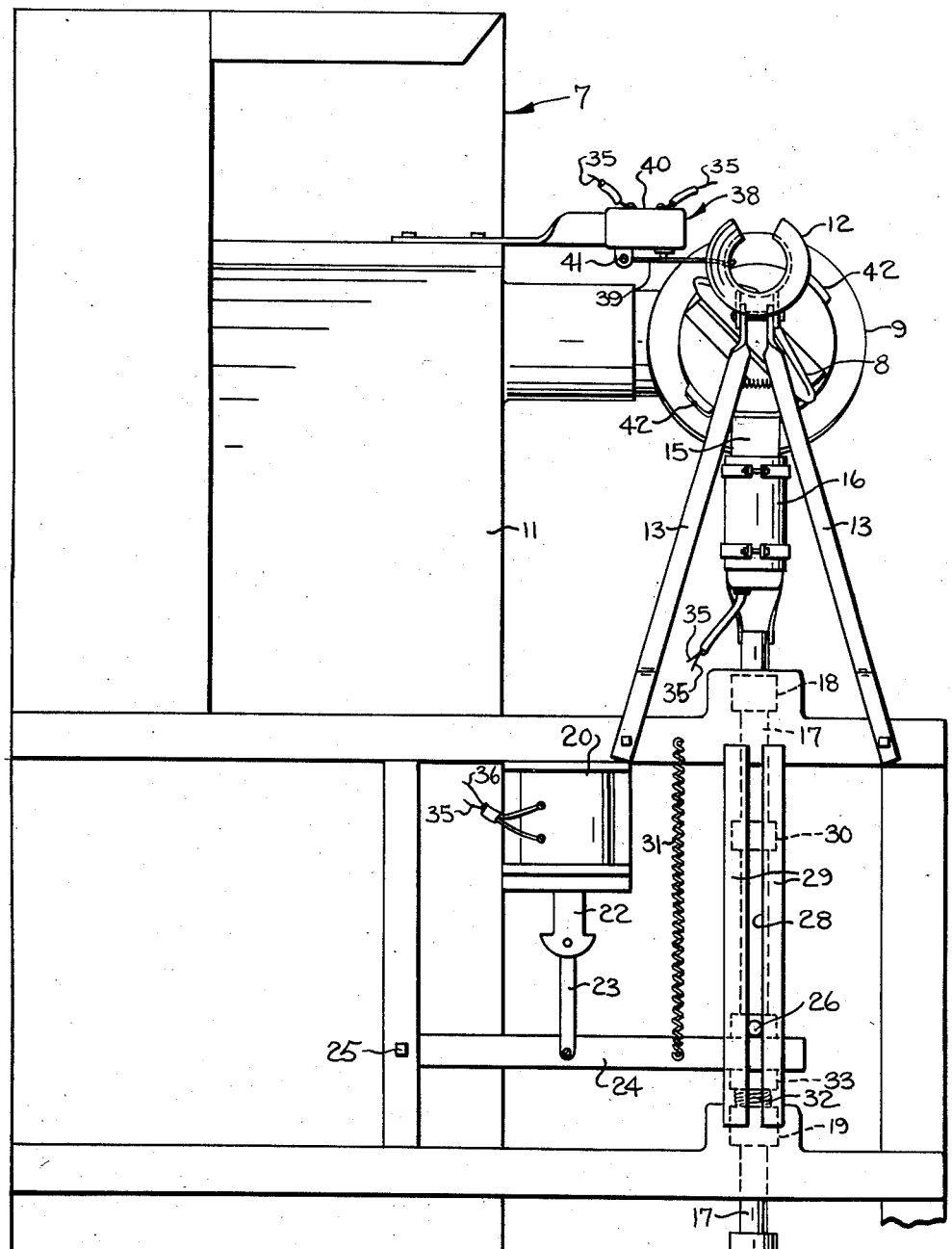

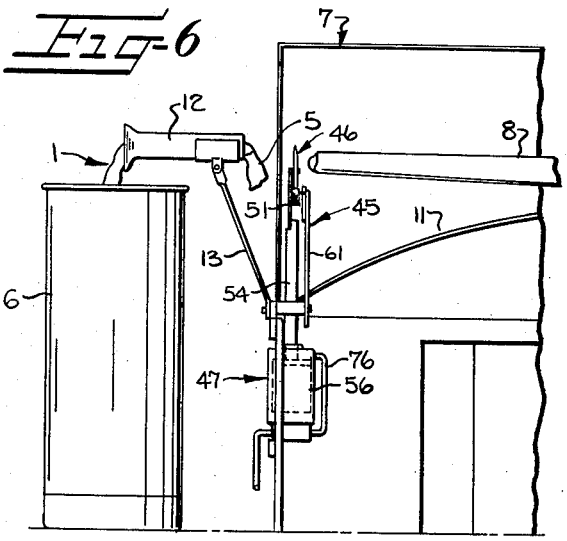
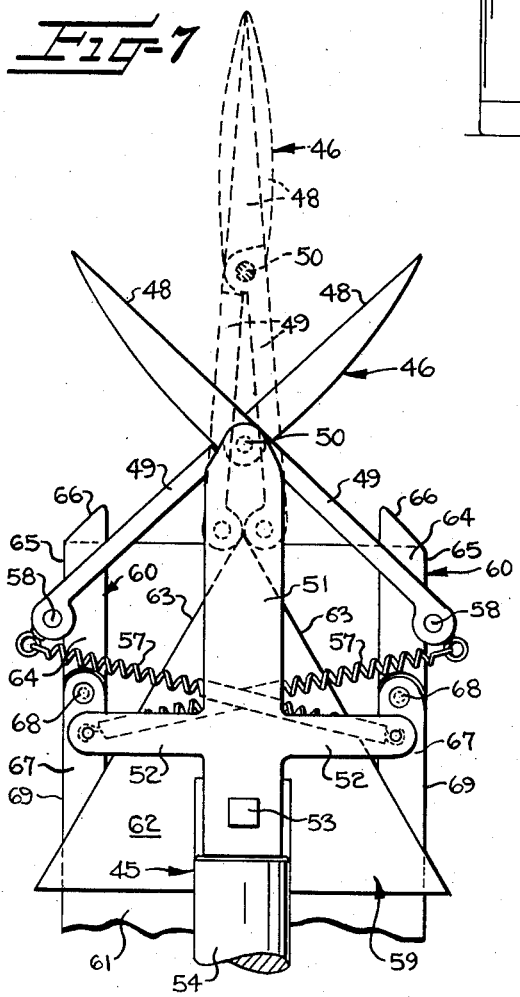
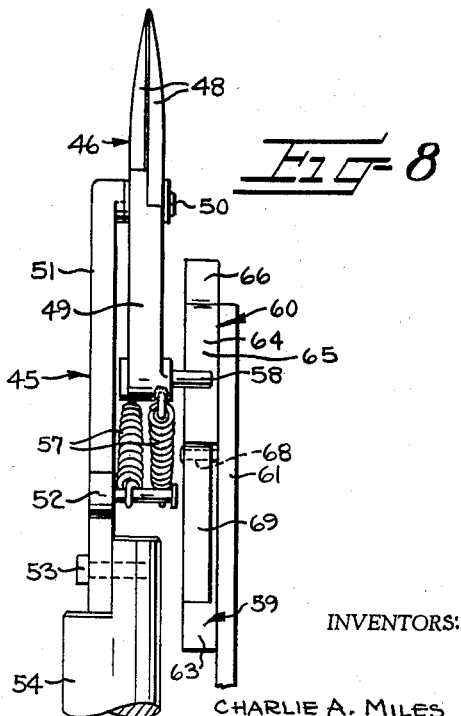
INVENTORS:
CHARLIE A. MILES
and LEX B. SWANNER
BY Eaton, Bell, Hunt + Seltzer
ATTORNEYS

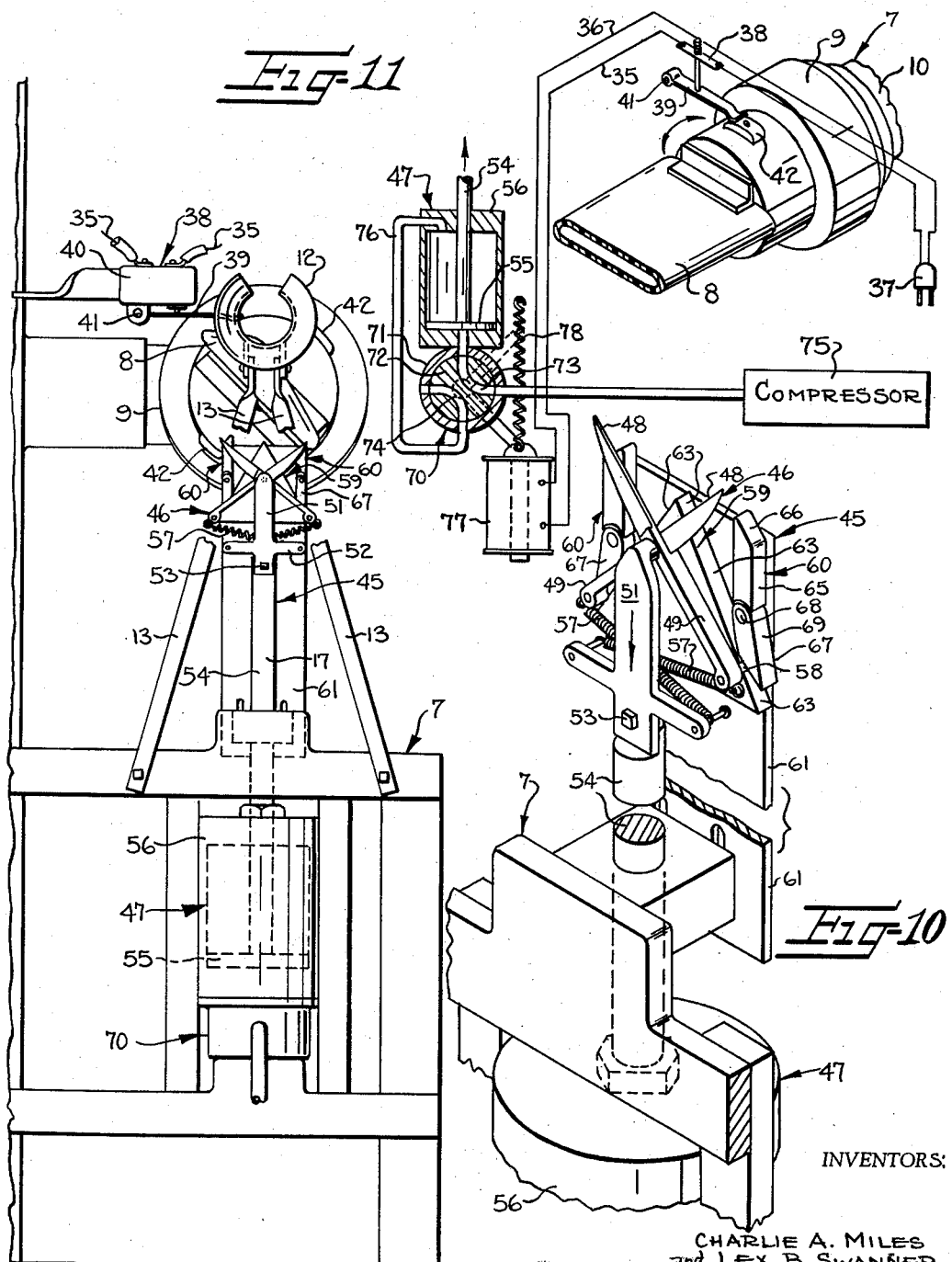

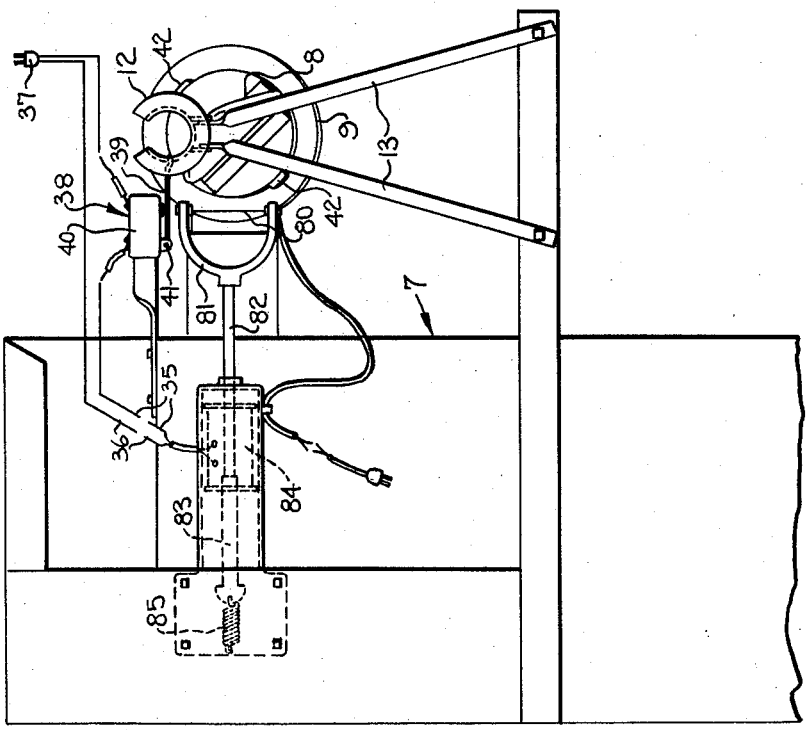
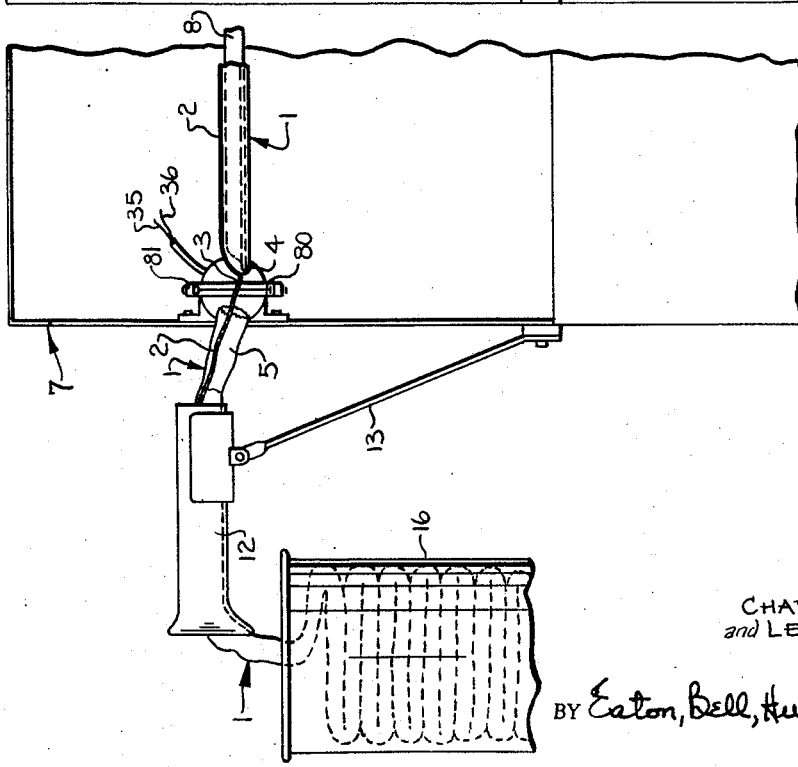

United States Patent Office 2,898,021
Patented Aug. 4, 1959

2,898,021

APPARATUS FOR HANDLING HOSIERY

Charlie A. Miles and Lex B. Swanner, Burlington, N.C., assignors, by mesne assignments, to Alamance Industries, Inc., Concord, N.C., a corporation of North Carolina Application June 6, 1956, Serial No. 589,772

11 Claims. (Cl. 223—75)

This invention relates to apparatus for inspecting successive stockings seamed together and for severing the stitching connecting successively seamed stockings together as they are being inspected.

Heretofore in seaming hosiery, an operator manually inserts successive stockings to be seamed into a seaming machine by which each successive stocking is seamed and connected to the next succeeding stocking by the stitching. After only a short length of each successive stocking has been seamed the operator stops the seaming machine and moves the previously seamed stocking with its connecting stitching to a stationary cutting blade to separate each successively seamed stocking from the next succeeding stocking by severing the connecting stitching, after which the seaming machine is again started to complete the seaming of the partially seamed stocking. This operation is then repeated with each successive stocking. After each stocking is severed from the next succeeding stocking, the operator straightens it out lengthwise and lays it in a tray from which the greige inspector successively removes individual stockings and positions them on the inspection form of an automatic greige inspection machine for inspecting. This successive stopping and starting of the seaming machine and the manual severing of the stitching between successively seamed stockings and the resultant handling of individual stockings is very time consuming and results in a great loss of production. It is also very fatigueing to the operator which further decreases production. With our invention the starting and stopping of the seaming machine, the manual severing of the stitching between successively seamed stockings and the excessive handling thereof are all eliminated.

Data obtained during normal plant operation disclosed that a seamer who heretofore seamed thirty dozen pairs of hose in an eight hour period was now able to seam over forty-five dozen pairs of hose in the same period and did not feel near as physically tired at the end of the day. The increase in production of over fifty percent and the reduction of physical fatigue is directly traceable to the elimination of the heretofore conventional step of the operator having to reach forwardly to move the connecting stitching joining adjacent hose over the stationary cutting blade to sever the same. Such data also disclosed that the handling of hosiery on inspection machines equipped with our apparatus is greatly expedited.

Hosiery is prepared for handling in conjunction with our apparatus by seaming successive stockings from the toe to the welt with successively seamed stocking being chained together, toe to welt by the stitching. As the successively seamed stockings leave the seaming machine they pass down a chute into a suitable container wherein the last stocking seamed is at the top of the lot. The filled container of stockings thus seamed and chained together is then transferred to an automatic griege inspecting machine and an empty container substituted therefor at the seaming machine. In inspecting the stockings the greige operator takes the last seamed stocking from the top of the pile in the container and draws it from a suitable supporting guide onto an inspection form which is generally oval or elliptical in cross section. As each successive stocking is drawn onto the inspection form, the next succeeding stocking which is chained thereto is drawn thereby up from the container and onto the supporting guide in position to be pulled onto the inspection form as soon as the preceding stocking has been removed therefrom. After the inspector inspects one side of the stocking he rotates the inspection form through 180° to bring the other side of the stocking into view for inspection. The rotating of the inspection form may momentarily close a normally open switch to effect the operation of severing mechanism by which the switching connecting the toe of the stocking on the inspection form to the welt of the stocking on the supporting guide is severed. After a stocking has been inspected it may be removed from the inspection form by suction as is standard practice.

The object of the invention is to provide in combination with a conventional greige inspection machine mechanism by which stitching connecting successively seamed stockings together is automatically severed during the inspection of successively seamed stockings.

Further and more limited objects of the invention will be apparent from the following specification and the accompanying drawings forming a part thereof in which:

Figure 1 is a schematic front elevation of a conventional greige inspecting machine showing one form of the mechanism of our invention for automatically severing the connecting stitching between the toe and welt of successive stockings during inspecting applied thereto;

Figure 2 is an enlarged fragmentary sectional view taken on the line 2—2 of Figure 1;

Figure 3 is a diagrammatic view in perspective showing the severing mechanism of Figures 1 and 2 and the control therefor;

Figure 4 is an enlarged front elevation of the severing mechanism as shown in Figure 1 and illustrating the manner in which successive chained together stockings are withdrawn from a container and applied to the inspection form of the greige inspection machine;

Figure 5 is a side elevation of the severing mechanism shown in Figure 4 as viewed from the left hand side of Figure 4 with the stocking container removed;

Figure 6 is a view similar to Figure 4, on a reduced scale, showing another form of the mechanism for severing the connecting stitching between the toe and welt of successively seamed chained together stockings;

Figure 7 is a fragmentary side elevation, on an enlarged scale, of the severing mechanism shown in Figure 6;

Figure 8 is a front elevation of the severing mechanism of Figure 6 as shown in Figure 7;

Figure 9 is a view similar to Figure 5 of the severing mechanism shown in Figures 6, 7, and 8;

Figure 10 is a perspective view of the severing mechanism shown in Figures 6 to 9, inclusive;

Figure 11 is a diagrammatic view, partially in section and partially in perspective, showing the means for actuating and controlling the operation of the severing mechaism shown in Figures 6 to 10, inclusive;

Figure 12 is a view similar to Figures 4 and 6 of still another form of severing mechanism; and Figure 13 is a view similar to Figures 5 and 9 of the severing mechanism shown in Figure 12.

The various stitch severing mechanisms of our invention are shown in the drawings as being applied to a conventional greige inspecting machine. Consequently only such parts of a conventional greige inspecting machine are shown in the drawings as are necessary to illustrate the application of our severing mechanisms thereto, In the production of full fashioned hosiery according to our invention, successive stockings 1 are continuously seamed as indicated at 2 by a conventional seaming machine and chained together by the seaming stitching as shown at 3 with the toe 4 of each stocking seamed connected to the welt 5 of the next succeeding stocking by the seaming stitching. As the seamed stockings leave the seaming machine, successive stockings are deposited in a pile in a container 6 with the last stocking seamed being on top of the pile. The container 6 of chained together seamed stockings is then transferred to a conventional greige inspection machine, generally indicated by the numeral 7, for inspection. The inspection machine 7 comprises an elongated open ended hollow inspection form 8 which is generally oval in cross section and is rotatably supported by a bearing housing 9. Heretofore in inspecting hosiery on a machine of this character, an unturned stocking which has been seamed and severed from the next succeeding seamed stocking is manually drawn onto the inspection form 8. After the near side of the stocking has been inspected the form 8 is rotated 180° to bring the far side of the stocking into view for inspection, after which the inspected stocking is withdrawn and turned by suction from the inspection form 8 through the free open end thereof and a tube 10 and deposited upon a stocking platform 11 in accordance with standard practice.

In accordance with our invention we provide a supporting guide 12 which is secured to the inspecting machine 7, substantially in alignment with the inspection form 8, by brackets 13. The first stocking to be inspected is drawn up from the top of the pile of chained together stockings in the container 6 over the supporting guide 12 and onto the inspection form 8. As each stocking 1 is pulled from the supporting guide 12 onto the inspection form 8, it pulls the next succeeding stocking 1 connected thereto by the stitching 3 up from the container 6 and onto the supporting guide 12. Then when the inspection form 8 is rotated, to bring the far side of the stocking on the inspection form 8 into view for inspection, it effects the operation of severing mechanism, generally indicated by the numeral 14, which severs the stitching 3 connecting the toe 4 of the stocking on the inspection form 8 to the welt 5 of the stocking on the supporting guide 12. The inspected stocking on the form 8 is then removed from the form 8, as previously explained, after which the stocking on the supporting guide is manually pulled onto the inspection form 8 by the operator. This operation is then repeated for each successive stocking inspected.

The construction and operation of the severing mechanism 14 will now be described with reference to Figures 1 to 5, inclusive, of the drawings. This mechanism comprises an electrically operated clipper 15, of standard well known construction, which is removably secured in a case 16 carried by the upper end of a vertically reciprocal rod 17, which is slidably mounted in vertically spaced upper and lower guide blocks secured to the inspection machine 7 and designated 18 and 19 respectively. The rod 17 and clipper 15 are adapted to be raised from their normal inoperative position, as shown in Figures 1, 4, and 5, by a solenoid 20, and to be returned by gravity. The solenoid 20 comprises the winding 21 and an armature 22 which is pivotally connected by a link 23 to a lever 24 having one end thereof pivotally secured to the inspection machine 7 as indicated at 25. The lever 24 adjacent the free end thereof engages a pin 26 carried by a collar 27 permanently secured to the rod 17. The solenoid 20, when energized, raises the free end of the lever 24 which by its engagement with the pin 26 raises the rod 17 and clipper 15 carried thereby up into position to sever the connecting stitching 3 between the toe 4 of the stocking 1 on the inspection form 8 and the welt 5 of the stocking 1 on the supporting guide 12. During the raising and lowering of the rod 17 and clipper 15 the pin 26 rides in a slot 28, defined by two spaced guides 29 secured to the inspection machine 7, and thereby prevents turning of the clipper 15 out of proper severing position. The upward movement of the rod 17 and clipper 15 is limited by a collar 30 which is adjustably secured on the rod 17 and is adapted to engage the under side of the upper guide block 18 when the clipper 15 reaches proper severing position. A coiled spring 31 connected to the machine 7 and the lever 24 is provided to counterbalance the mechanism during the raising and lowering of the clipper 15; and a spring 32 mounted on the rod 17 between a collar 33 and the lower guide block 19 is provided to cushion the downward movement of the rod 17 and clipper 15.

The solenoid 20 and clipper 15 are connected in series with each other by conductors 35 and 36 which are adapted to be connected to an electric outlet by a plug 37. The energization of the solenoid 20 and clipper 15 is controlled by a normally open switch 38 which is interposed in the conductor 35 and is adapted to be closed by an arm 39 pivoted to the switch housing 40 as indicated at 41 in position for the forward free end thereof to be engaged by actuating cams 42 carried by the inspection form 8 diametrically opposite each other. During the turning of the inspection form 8, after the near side of a stocking thereon has been inspected, to bring the far side of the stocking into view for inspection one of the cams 42 will engage the arm 39 and close the switch 38 thereby energizing both the solenoid 20 and the clipper 15. The clipper will then be raised and sever the connecting stitching 3. This operation is then repeated for each successive stocking inspected.

In Figures 6 to 11 inclusive, we have shown another form of severing mechanism, generally indicated by the numeral 45, by which the connecting stitching between successive stockings is severed during turning of the inspection form 8. In this form of severing mechanism we have substituted a pair of scissors or shears 46, which are positively raised and lowered by pneumatic means 47, for the clipper 15 of the form of mechanism shown in Figures 1 to 5. The scissors 46 comprise two opposed cutting blades 48, having actuating handles 49 integral therewith, and which are pivotally secured at 50 to the upper end of a bracket 51 having the oppositely extending arms 52. The bracket 51 is removably secured as indicated at 53 to the upper end of a piston rod 54 the lower end of which is secured to a piston 55, reciprocally mounted in a cylinder 56, by which the piston rod 54 and the bracket 51 and scissors 46 carried thereby are raised and lowered during operation as will be explained hereinafter.

A coiled tension spring 57 is connected between the lower end of each of the scissor handles 49 and the outer end of one of the arms 52. These springs 57 are provided to quickly rotate the cutting blades 48 from the normal at rest open position as shown in full lines in Figure 7 to the closed cutting position shown in dotted lines in Figure 7 as the scissors are raised to operative position by the piston 55 and piston rod 54. Secured to each of the scissor handles 49 is an outwardly extending pin 58 which co-acts with cam means 59 and camming members 60 to control the opening and closing of the cutting blades 48 under the influence of the springs 57. The cam means 59 and the camming members 60 are secured to a supporting member 61 which in turn is permanently secured to the inspection machine 7 adjacent the scissors 46 and the piston rod 54 by which the scissors are raised and lowered. The cam means 59 comprises a plate 62 having the downwardly and outwardly inclined edges 63; and the camming members 60 each comprises a block 64 having a vertically disposed outer edge 65 and an upwardly and inwardly inclined edge 66. A finger 67 is pivotally secured to the supporting member 61 below each of the camming members 60, as indicated at 68, with the outer edges 69 thereof normally disposed in alignment with the outer edges 65 of the camming members 60. During the upward movement of the scissors 46 by the piston 55 and piston rod 54 the pins 58 carried by the scissor handles 49 ride up the aligned vertical edges 69 and 65 of the fingers 67 and camming members 60 and off of the inclined edges 66 of the members 60. As the pins 58 ride off of the inclined edges 66 the springs 57 quickly snap the scissor blades 48 to closed position and sever the connecting stitching 3 connecting the toe 4 of the stocking 1 on the inspection form 8 to the welt 5 of the stocking 1 in the supporting guide 12. And then on the downward movement of the scissors 46 the pins 58 ride down the downwardly and outwardly inclined edges 63 of the cam means 59 and under and past the pivoted fingers 67 as shown in Figure 10, and thereby return the blades 48 to open position against the resistance of the springs 57. After the pins 58 have been moved past the fingers 67, the fingers 67 return by gravity from the position shown in Figure 10 back to their normal position as shown in Figure 7. The mechanism is then ready for the next inspecting and severing operation.

The reciprocation of the pison 55 in the cylinder 56 is controlled by a three-way valve 70 which comprises the casing 71 and a plug 72 having the passageways 73 and 74 therein through which air under pressure from a source 75 of compressed air is admitted to the cylinder 56 first on one side of the piston 55 and then on the other side thereof, while the cylinder on the opposite side of the piston is being vented to the atmosphere. When the valve plug 72 is in the position shown in Figure 11 air is being admitted through the passageway 73 to the bottom of the cylinder 56 below the piston 55 to raise the severing mechanism up from normal at rest inoperative position to operative severing position. At the same time the cylinder 56 above the piston 55 is being vented to the atmosphere through the conduit 76 and passageway 74. Upon the turning of the plug 72 through 90° in a counter-clockwise direction from the position shown in Figure 11 air under pressure from the source 75 will be admitted through the passageway 74 and conduit 76 to the top of the cylinder 56 above the piston 55 while at the same time the cylinder 56 below the piston is being vented to the atmosphere through the passageway 73. The mechanism will then be returned to normal inoperative position.

The valve plug 72 is alternately rotated back and forth between its two positions by a solenoid 77 and a spring 78. When the solenoid 77 is energized it will, through the arm 79 connected to the valve plug 72, rotate the plug 72 to and hold it in the position shown in Figure 11 to admit air under pressure to the bottom of the cylinder 56. Upon de-energization of the solenoid 77 the spring 78 will rotate the valve plug 72 back to normal at rest position to admit air under pressure to the top of the cylinder 56. The energization of the solenoid 77 is controlled by the switch 38 and the switch actuating cams 42 in the same manner as described in connection with the form of severing mechanism shown in Figures 1 to 5.

In Figures 12 and 13 we have shown still another form of severing mechanism. In this form of the invention we have shown the mechanism as disposed horizontally instead of vertically, and we employ an electrically heated resistance wire 80 for severing the stitching 3 instead of the clipper 15 or the scissors 46 used in the forms of the invention previously described. The wire 80 is secured to and between the outer ends of the prongs of a fork 81 carried by the forward end of a slidably mounted rod 82. The rear end of the rod 82 is connected to the armature 83 of a solenoid 84 which when energized is operative to move the wire 80 forwardly into position to sever the stitching 3 between successive stocking being inspected. The mechanism is returned to normal inoperative position, shown in Figure 13, by a spring 85 connected to the solenoid armature 83. The resistance wire 80 is disposed in series with the solenoid 84, and the energization of both the solenoid 84 and the severing wire 80 are controlled by the switch 38 and switch actuating cams 42 in the same manner as described in connection with the mechanism of Figures 1 to 5.

From the foregoing it will be apparent to those skilled in this art that we have provided a very simple and efficient apparatus for accomplishing the objects of our invention.

And it is to be understood that we are not limited to the forms of the invention shown and described herein as various modifications may be made therein within the spirit of the invention and the scope of the appended claims.

It will be appreciated from the foregoing that the construction and operation of each disclosed species is such that the severing means, in each instance, is moved through a predetermined or fixed path to cause the severing means to engage the stitching at a fixed distance from the inspection form when the severing means is actuated.

We claim:

1. An apparatus for inspecting successive hose stitched together toe to welt in a chain and for severing the stitching between successive hose, comprising an inspection form onto which successive hose in said chain of hose are drawn for inspection, supporting guide means spaced from said inspection form to define a fixed path for successive hose and their connecting stitching to the inspection form, stitch severing means, and means for moving the stitch severing means in a fixed path between the supporting guide means and the inspection form to sever the stitching connecting the toe of a hose on said inspection form to the welt of the next successive hose in said chain of hose at a fixed distance from the inspection form.

2. An inspecting and severing apparatus as defined in claim 1 wherein said inspection form is rotatable and said last-named means includes control means operatively connected to the rotatable inspection form to actuate the severing means, whereby the connecting stitching may be severed by rotation of the inspection form during the inspection of a hose thereon.

3. An inspecting and severing apparatus as defined in claim 1 in which said severing means includes an electrically operable clipper.

4. An inspecting and severing apparatus as defined in claim 1 in which said severing means comprises a pair of pivoted cooperating shearing blades, and means for closing and opening the shearing blades respectively as they are moved into and out of severing engagement with the connecting stitching.

5. An inspecting and severing apparatus as defined in claim 1 in which said severing means includes an electrically heated resistance wire.

6. An inspecting and severing apparatus as defined in claim 5 in which the inspection form is rotatable, and wherein said last-named means includes control means operatively connected to the inspection form for controlling heating of the resistance wire and movement of the severing means through rotation of the inspection form.

7. An inspecting and severing apparatus as defined in claim 1 in which said last-named means includes a solenoid operatively connected to the severing means.

8. An inspecting and severing apparatus as defined in claim 7 wherein the inspection form is rotatable, an eccentric surface on the inspection form, and a normally open switch disposed adjacent the eccentric surface on the inspection form and engageable by a portion of the eccentric surface during rotation of the inspection form, whereby the switch may be momentarily closed by rotation of the inspection form to energize the solenoid and move the severing means into stitch severing engagement.

9. Apparatus for the severing of stitching between hose connected together toe to welt in string formation by chains of stitching, comprising a movable inspection form having a free end over which a first hose is adapted to be drawn to position its toe over the free end of the inspection form with the stitching extending therefrom, a frame associated with the inspection form, severing means connected to the frame and spaced outwardly from the inspection form for severing the stitching adjacent the free end of the inspection form, and actuating means operatively connected to the severing means and responsive to movement of the inspection form for moving the severing means into and out of stitch severing position.

10. An inspecting and severing apparatus as defined in claim 9 in which said severing means comprises a severing device and support means therefor reciprocally mounted on said frame, and wherein said actuating means comprises a solenoid mounted on said frame and operatively connected to the support means, said solenoid being operative when energized to move the reciprocal support means and the severing device carried thereby through a predetermined path from normally at rest inoperative position to operative severing position, and control means operatively connected to the solenoid and to the inspection form whereby energization of said solenoid is controlled through movement of the inspection form.

11. An inspecting and severing apparatus as defined in claim 10 in which said control means comprises a normally open switch connected in series with said solenoid, and switch actuating means carried by said inspection form in position to momentarily close the switch during movement of the inspection form.

References Cited in the file of this patent

UNITED STATES PATENTS

| | | |
|---|---|---|
| 1,712,094 | Scholler | May 7, 1929 |
| 2,151,438 | Pierce | Mar. 21, 1939 |
| 2,469,961 | Gottschalck | May 10, 1949 |
| 2,485,004 | Leuliette | Oct. 18, 1949 |
| 2,510,332 | Dameron et al. | June 6, 1950 |
| 2,539,627 | Kindseth et al. | Jan. 30, 1951 |
| 2,592,463 | Phillips | Apr. 8, 1952 |
| 2,704,988 | Rosenbloom | Mar. 29, 1955 |
| 2,705,466 | Sargrove et al. | Apr. 5, 1955 |
| 2,711,703 | Duby | June 28, 1955 |
| 2,722,348 | Ammon | Nov. 1, 1955 |
| 2,787,231 | Shoaf | Apr. 2, 1957 |

OTHER REFERENCES

Textile World Publication, "Production Raised 10% in Full Fashioned Seaming," James H. Blore, page 93. (Copy available Div. 24.)